(12) United States Patent
Marlin et al.

(10) Patent No.: US 8,424,921 B2
(45) Date of Patent: Apr. 23, 2013

(54) COMPOSITE COUPLING WITH A MACHINING PORTION

(75) Inventors: Francois Marie Paul Marlin, Villiers Sous Grez (FR); Philippe Verseux, Draveil (FR)

(73) Assignee: SNECMA, Paris (FR)

( * ) Notice: Subject to any disclaimer, the term of this patent is extended or adjusted under 35 U.S.C. 154(b) by 684 days.

(21) Appl. No.: 12/333,467

(22) Filed: Dec. 12, 2008

(65) Prior Publication Data

US 2009/0200700 A1 Aug. 13, 2009

(30) Foreign Application Priority Data

Jan. 4, 2008 (FR) ...................... 08 50037

(51) Int. Cl.
*F16L 33/01* (2006.01)
*F16L 47/14* (2006.01)

(52) U.S. Cl.
USPC .............. 285/222.1; 285/405; 285/293.1

(58) Field of Classification Search ............... 285/222.2, 285/293.1, 222.1, 405, 412; 138/153
See application file for complete search history.

(56) References Cited

U.S. PATENT DOCUMENTS

| | | | | |
|---|---|---|---|---|
| 2,703,109 A | * | 3/1955 | Saville | 285/55 |
| 2,911,236 A | * | 11/1959 | Thibault | 285/222.4 |
| 3,537,484 A | * | 11/1970 | McLarty | 138/109 |
| 3,651,661 A | | 3/1972 | Darrow | |
| 3,778,185 A | * | 12/1973 | Plowman et al. | 415/209.4 |
| 3,874,711 A | * | 4/1975 | Scalzo et al. | 285/236 |
| 4,702,498 A | * | 10/1987 | Mueller et al. | 285/55 |
| 4,927,476 A | * | 5/1990 | Watkins | 156/173 |
| 4,980,006 A | | 12/1990 | Bordner | |
| 6,361,080 B1 | * | 3/2002 | Walsh et al. | 285/55 |
| 6,604,761 B1 | * | 8/2003 | Debalme et al. | 285/353 |
| 6,719,058 B2 | * | 4/2004 | Salama et al. | 166/367 |
| 2006/0054231 A1 | * | 3/2006 | Wolfram et al. | 138/109 |
| 2009/0197031 A1 | * | 8/2009 | Porte et al. | 428/36.91 |

* cited by examiner

*Primary Examiner* — James Hewitt
(74) *Attorney, Agent, or Firm* — Oblon, Spivak, McClelland, Maier & Neustadt, L.L.P.

(57) ABSTRACT

A coupling made of composite material including a polymer matrix reinforced by a fiber structure is disclosed. The coupling includes a structural portion reinforced by a main fiber structure, and a first machining portion reinforced by a first fiber structure that is distinct from the main fiber structure. The matrices of the structural portion and of the first machining portion are identical. The first machining portion is situated on at least a fraction of the main face of the structural portion and is machined in a first machining surface, and there is no intersection between the first machining surface and the fibers of the main fiber structure.

10 Claims, 3 Drawing Sheets

COMPOSITE COUPLING WITH A MACHINING PORTION

FIELD OF THE INVENTION

The present invention relates to a coupling made of composite material comprising a polymer matrix reinforced by a fiber structure.

BACKGROUND OF THE INVENTION

In mechanical structures, parts are often connected together with the help of couplings. In general, a coupling is defined as being a mechanical part that serves to join together two other parts, or to reinforce a part. In structures where weight saving is sought after, for example in a turbomachine, couplings are often made of composite materials having a polymer matrix reinforced by fibers such as carbon fibers, glass fibers, or Kevlar® fibers. Such composite materials present density that is considerably smaller than that of the light alloys commonly in use, and they present better mechanical performance (in terms of stiffness and resistance to rupture).

By way of example, a coupling may be annular in shape. Such an annular coupling may be of the type used for joining a retention casing with an air inlet sleeve or an intermediate casing shroud. It may possess at one of its axial ends (i.e. at one end along its axis of symmetry) an angled region or "flange" joining the tubular central portion of the coupling at the end of the coupling, which flange extends substantially radially. This end includes holes for receiving bolts enabling the annular coupling to be secured with the structure against which said end comes into contact.

More-recent composite materials are made by preparing a three-dimensional fiber preform, i.e. by weaving or braiding fibers in three dimensions. Such a preform is subsequently densified with a polymer in order to make the finished composite part, in which the yarns of the preform are embedded within a solid polymer matrix.

By way of example, one known technique for achieving such densification is liquid impregnation: a distinction is drawn between infusion and injection. With the infusion technique, the preform is placed between a mold half and a cover, a chemical precursor of the polymer is then infiltrated while in liquid form via one end of the preform while a vacuum is established between the mold half and the cover. Under the action of the vacuum, the precursor diffuses throughout the preform, after which it is polymerized by heat treatment so as to be solidified. In the injection technique, the preform is placed in a mold and then the liquid precursor is injected into the mold via a plurality of points until the entire mold is filled (the resin transfer molding (RTM) method), and is then polymerized by heat treatment.

Another known technique for densifying the preform is chemical vapor infiltration (CVI). The preform is then placed in an enclosure and a gaseous phase containing a precursor of the polymer is admitted into the enclosure. Under the temperature and pressure conditions that are established inside the enclosure, the gas diffuses into the preform where it transforms into a polymer on coming into contact with the fibers of the preform.

In order to ensure that the coupling has adequate mechanical behavior, it is necessary for the outer surfaces thereof to match exactly the surfaces of the part with which the coupling comes into contact and to which it is assembled.

Unfortunately, the geometrical specifications for coupling assemblies (or coupling reinforcements) are very varied. The technique consisting in making a different mold for each assembly configuration is not economically viable. Furthermore, for a coupling that possesses a flange, in particular an annular coupling in which the flange is circumferential, the preform can never be deformed sufficiently to match exactly the outlines of the mold in the corners of the flange, since the radius of curvature in these corners is too small. As a result, after densification, the corners of the coupling are zones that are rich in polymer, and therefore mechanically weaker.

In order to accommodate all existing geometrical specifications for couplings, it is therefore necessary to machine those regions of such couplings that come into contact with the surfaces of adjacent parts.

Unfortunately, it is not acceptable to machine the coupling since any such machining would cut through the fibers of the preform, thereby compromising the mechanical integrity of the coupling, since it is the fibers that provide it with mechanical strength.

OBJECT AND SUMMARY OF THE INVENTION

The invention seeks to provide a coupling that can adapt to any assembly or reinforcement configuration, while conserving its own mechanical integrity.

This object is achieved by the coupling comprising:
a structural portion reinforced by a main fiber structure; and
a first machining portion reinforced by a first fiber structure distinct from the main fiber structure;
the matrices of said structural portion and of said first machining portion being identical, said first machining portion being situated on at least a fraction of the main face of said structural portion and being machined in a first machining surface, and there being no intersection between said first machining surface and the fibers of said main fiber structure.

By means of these dispositions, it is possible to machine the coupling, i.e. its machining portion, in such a manner that its outside surfaces closely match the surfaces of parts with which the coupling is to come into contact, and does so without the structural portion of the coupling (and in particular the fiber structure reinforcing said structural portion) being cut into by the machining. Thus, the coupling conserves its mechanical performance and its positioning relative to the structure on which it is fastened.

Advantageously, the coupling further comprises a second machining portion reinforced by a second fiber structure distinct from said main fiber structure and machined in a second machining surface, there being no intersection between said second machining surface and the fibers of said main fiber structure, the matrices of said structural portion and of said second machining portion being identical, said second machining portion being situated on at least a fraction of the face opposite said main face.

Thus, the coupling can be machined on two opposite faces without the structural portion being cut into by the machining. When the coupling is for clamping between two parts, the presence of a machining preform on each of the faces of the coupling that is to come into contact with one of those two parts enables the outside surfaces of the coupling to be given a shape that accurately matches the portions of those two parts with which they come into contact. Thus, the coupling can be held tightly clamped and accurately in place between those two parts.

The invention also provides a method of fabricating a coupling.

According to the invention, the method comprises shaping a first preform on a mandrel, shaping a second preform on said first preform, one of said two preforms being structural, densifying said first and second preforms with a common polymer matrix to form respectively a first portion and a second portion of said coupling, and machining the portion having a preform that is not structural.

Advantageously, the method includes shaping a third preform on said second preform prior to densifying said first and second preforms, densifying said third preform simultaneously with densifying said first and second preforms with a common polymer matrix to form a third portion, and machining said first portion and said third portion.

BRIEF DESCRIPTION OF THE DRAWINGS

The invention can be well understood and its advantages appear better on reading the following detailed description of an embodiment given by way of non-limiting example. The description refers to the accompanying drawings, in which.

MORE DETAILED DESCRIPTION

Figure 1:
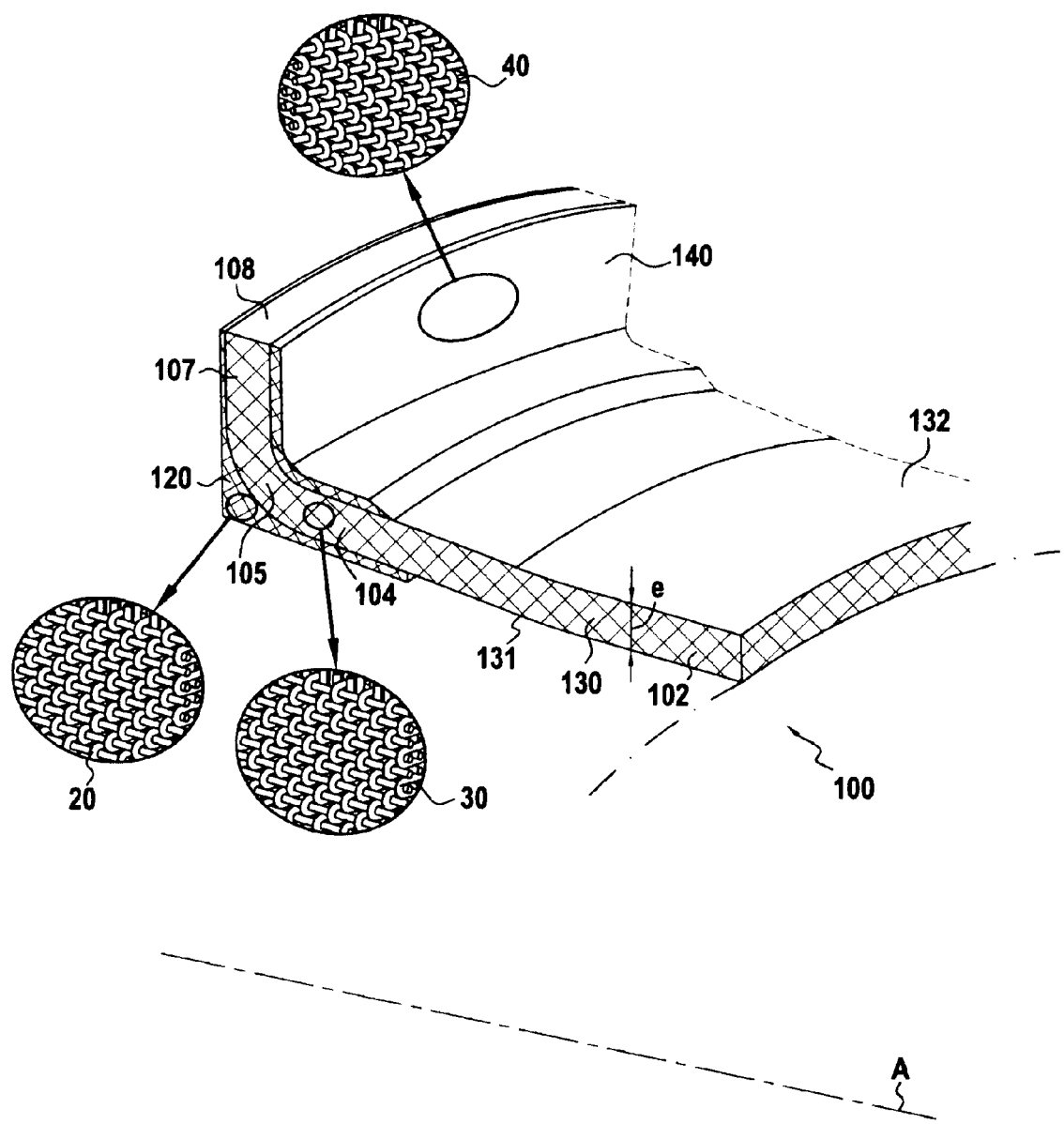
FIG. 1 is a perspective view in section of an annular coupling of the invention.

FIG. 1 shows an annular coupling 100 having a main axis A and possessing an annular angled region 105 that is thus centered on said axis. The angled region 105 is situated close to one end of the coupling 100 and subdivides the coupling 100 into a cylindrical region 102 and an annular radial region 107 that extends the angled region 105 radially outwards. The radial region 107 is terminated by an end surface 108 that is cylindrical and that extends axially (along the main axis A) over a distance substantially equal to the thickness e of the cylindrical region 102, this thickness e being defined as being the radial extent of this cylindrical region 102. Alternatively, this distance may be other than the thickness e.

In the example shown, the angled region 105 forms an angle of substantially 90°, such that the radial region 107 extends perpendicularly to the cylindrical region 102, in a radially outward direction. Alternatively, the radial region 107 could extend radially inwards (i.e. towards the axis A). More generally, the angled region may form an angle lying in the range 45° to 180°, for example an angle lying in the range 90° to 180°.

The coupling 100 is constituted by a structural portion 130 and by at least one machining portion. The structural portion 130 is designed to withstand the stresses to which the coupling 100 is subjected. In FIG. 1, the machining portion comprises a first machining portion 120 that is situated on a portion of the main face 131 of the structural portion 130, and a second machining portion 140 that is situated on a portion of the face 132 that is opposite from the main face 131. The main face 131 and the opposite face 132 are respectively the radially outer face and the radially inner face of the structural portion 130. Thus, the first machining portion 120 is situated on the convex face of the angled region 105. The second machining portion 140 is situated on the concave face of the angled region 105. The first machining portion 120 extends from the sub-region 104 of the cylindrical region 102 that is immediately adjacent to the angled region 105, along the angled region 105 and the radial region 107, as far as the end surface 108.

The coupling 100 is made of composite material, i.e. it comprises a matrix reinforced by a fiber structure. Thus, the structural portion 130 comprises a polymer matrix reinforced by a main fiber structure 30. Similarly, the first machining portion 120 comprises a polymer matrix reinforced by a first fiber structure 20, and the second machining portion 140 comprises a polymer matrix reinforced by a second fiber structure 40. These fiber structures are distinct from one another, i.e. they do not have any fibers in common. The polymer matrices of the structural portion 130, of the first machining portion 120, and of the second machining portion 140 form a continuous matrix, i.e. together they comprise a single piece. This continuity results from the method of fabricating the coupling 100 as described below, and confers on this coupling 100 better mechanical integrity than if the matrices of the structural and machining portions were made of different polymers.

For example, each of the first fiber structure 20, the main fiber structure 30, and the second fiber structure 40 is constituted by a preform of woven or braided fibers, the preform thus being a three-dimensional (3D) preform.

The role of the machining portions 120 and 140 is essentially geometrical. These portions confer on the coupling 100 a shape that comes as close as possible to the shape of the adjacent part to which each coupling is to be fastened, and they can be machined so that their outside surfaces match the shapes of those adjacent parts. Thus, the coupling 100 bears accurately against the parts adjacent thereto and can be fastened thereto in stable manner. In addition, the mechanical integrity of the coupling 100, i.e. its mechanical performance in use, is conserved. The main fiber structure 30 which confers mechanical performance to the coupling 100 is not damaged by machining the coupling 100 since the machining cuts through fibers only in the first fiber structure 20 and in the second fiber structure 40 (there being no intersection between the machining surfaces, i.e. the surfaces engaged by the machining tool, and the fibers of the main fiber structure 30).

Figure 2:
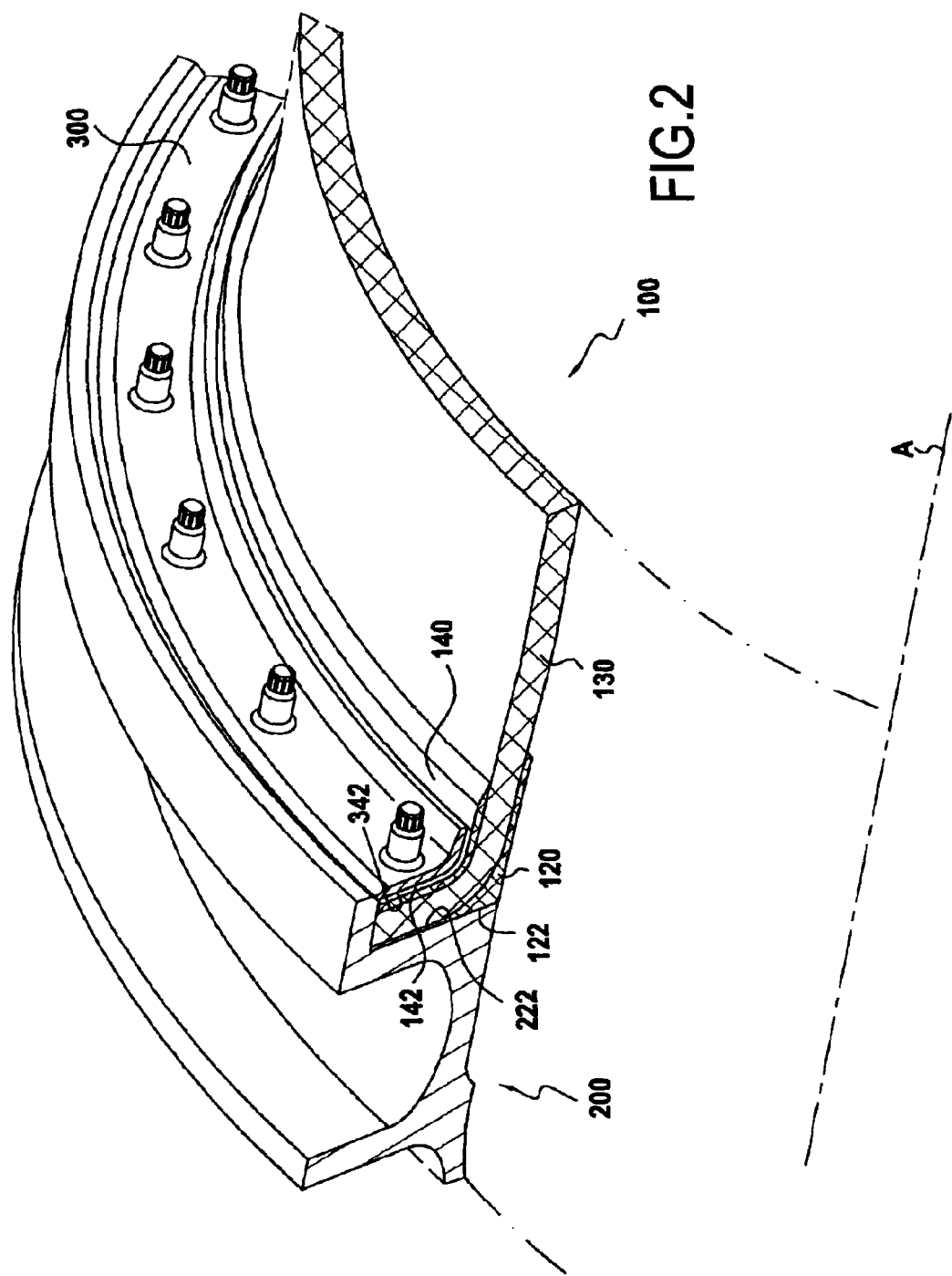
FIG. 2 is a perspective view in section of an annular coupling of the invention assembled to a casing.

For example, as shown in FIG. 2, the first machining portion 120 of the coupling 100 of FIG. 1 is machined so that the bearing face 122 of this first machining portion 120 that is to come into contact with the surface 222 of the adjacent part 200 accurately matches said surface 222. For example, this bearing face 122 is the face of the first machining portion 120 that extends substantially perpendicularly to the main axis A.

The second machining portion 140 of the coupling 100 of FIG. 1 is machined in such a manner that the concave bearing surface 142 of this second machining portion 140 that is to come into contact with the convex surface 342 of the backing plate 300 accurately matches this convex surface 342.

The use of respective machining preforms on two opposite faces of the coupling 100 makes it possible to ensure that these faces are accurately parallel.

Thus, the coupling 100 is caused to bear closely and tightly between the adjacent part 200 and the backing face 300. By way of example, this assembly can be held together by means of bolts passing through the coupling 100, with their nuts bearing against the backing plate (or alternatively against washers placed on the second machining portion 140). The machining performed on the coupling to make the holes through which the bolts pass should not be confused with the machining applied to the machining portions. The machining of these holes does not serve to match the outside surfaces of the coupling with the surfaces of the parts in which they come into contact.

Depending on the shape of the adjacent part, the coupling 100 need have only a first machining portion 120 (and no second machining portion 140), or it need have only a second machining portion 140 (and no first machining portion 120).

The other axial end (not shown) of the coupling 100 may also include one or more machining portions that are to be machined in order to match the shape of another adjacent part. For example, the other end of the coupling 100 may have a shape similar to that of the axial end shown in FIG. 2, i.e. it may be angled.

The above description relates to circumstances in which the coupling 100 is a coupling of annular shape, e.g. an assembly coupling, possessing one or more angled regions such that the machining portions are likewise angled. Alternatively, the coupling could be of a shape such that the machining portions are substantially plane.

Such couplings can be used to make the connection on any type of casing or shroud. For example a turbomachine may include such a coupling.

The coupling may also be a reinforcing part for fastening on a wall (e.g. by bolting). The reinforcing part may be a stiffener, e.g. a T-shaped or L-shaped stiffener. Such a stiffener may also form a coupling for fastening equipment.

Figure 3:
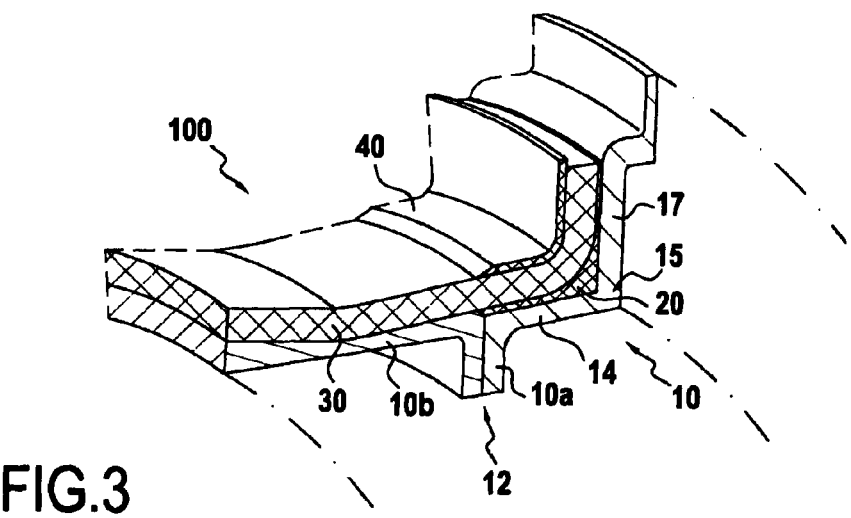
FIG. 3 is a perspective view in section of machining preforms as positioned on an angled annular mold in order to form an annular coupling of the invention.

The method of fabricating a coupling is described below, with reference to FIGS. 3 and 4. FIG. 3 shows an annular mandrel 10 having main axis A. This mandrel 10 possesses an angled portion 15 separating a cylindrical portion 12 of the mandrel 10 that is centered on the main axis A from a radial portion 17 of the mandrel 10. In the example shown, the mandrel 10 is subdivided into a primary portion 10a including the radial portion 17, the angled portion 15, and the sub-portion 14 of the tubular portion 12 adjacent of the angled portion 15, and a secondary portion 10b including the regions of the tubular portion 10 that are furthest from the angled portion 15. This subdivision on the mandrel facilitates subsequent molding of the coupling 100, the mandrel 10 constituting one of the walls of the mold.

A first preform 20 is shaped around the mandrel 10, in such a manner as to cover the radial portion 17, the angled portion 15, and the sub-portion 14 of the tubular portion 12. A second preform 30 is then shaped around the first preform 20. The second preform 30 is the structural preform for supporting the major part of the stresses (both mechanical and thermal) to which the coupling is to be subjected, as explained above. As shown in FIG. 3, a third preform 40 is then shaped around the second preform 30.

Alternatively, the second preform 30 need not have any preform shaped around it.

Alternatively, the second preform 30 may be shaped directly on the mandrel 10.

The preforms may be shaped using various methods. It is thus possible to shape them using one of the following methods: winding a woven or braided fiber preform around the mandrel 10, or by engaging a ring (a sock) of woven or braided fibers along the axis A, or by filamentary winding of fibers around the mandrel 10, or by depositing plies each made up of fibers preimpregnated with a polymer. In the last two examples, the preform is a two-dimensional (2D) preform.

Each of the first preform 20, the second preform 30, and the third preform 40 is preferably constituted by fibers of the same type, so as to minimize stresses at the interfaces between the preforms.

By way of example, these preforms may be made of carbon fibers, or of glass fibers.

The first preform 20, the second preform 30, and the third preform 40 are then densified so as to be embedded in a common polymer matrix, thereby constituting a coupling 100 that is made of composite material.

Various densification methods can be used. These methods are known in the state of the art and they are therefore described only briefly.

For example, preform densification may be performed by infusion, i.e. placing a cover (not shown) around the coupling 100 and fastened to the mandrel so as to constitute a hermetically-closed enclosure. The polymer that is to form the matrix of the coupling is then inserted into the enclosure and a vacuum is then established within the enclosure so as to obtain satisfactory impregnation of all of the preforms. Thereafter the polymer is hardened in known manner.

Alternatively, the preforms are densified by injection, using the known resin transfer molding (RTM) method.

Figure 4:
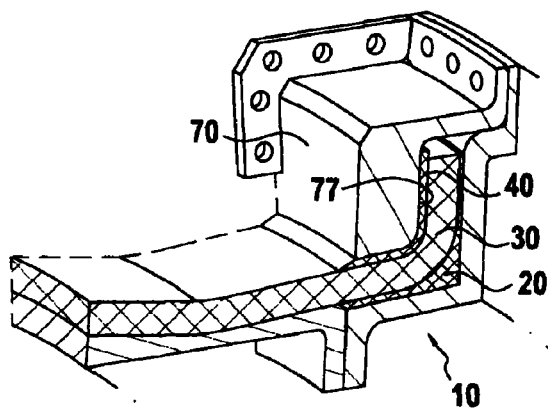
FIG. 4 is a perspective view of some of the machining preforms as positioned in an angled annular mold together with the use a backing form, in order of form an annular coupling of the invention.

Alternatively, the preforms are densified by infusion, and a backing form 70 is used as shown in FIG. 4. This backing form 70 covers the third preform 40 so that it holds the first preform 20, the second preform 30, and the third preform 40 in position between said backing form and the mandrel 10 so as to prevent the preforms moving during infusion of the matrix-constituting polymer. Thus, for annular preforms possessing an angled region, as shown in FIG. 4, the backing form 70 possess an annular angled surface 77 that covers the entire surface of the third preform 40 (or the entire surface of the second preform 30 that is substantially opposite the interface between said second preform 30 and the first preform 20).

The method of the invention may use any preform densification technique, and it is not limited to the techniques described above.

What is claimed is:

1. A system comprising:
   a coupling made of composite material comprising a polymer matrix reinforced by a fiber structure, said coupling comprising:
   a structural layer reinforced by a main fiber structure; and
   a first machining layer reinforced by a first fiber structure distinct from the main fiber structure; and
   an adjacent part including a mating surface,
   wherein matrices of said structural layer and of said first machining layer are identical,
   wherein said first machining layer is situated on at least a fraction of a main face of said structural layer, and is machined so as to present a first machining exterior surface with fibers which have been cut,
   wherein there is no intersection between said first machining exterior surface and fibers of said main fiber structure,
   wherein the first machining exterior surface of the first machining layer is machined to correspond to the mating surface of the adjacent part, and
   wherein the structural layer is not machined to correspond to the mating surface of the adjacent part.

2. The system according to claim 1, wherein the coupling is annular.

3. The system according to claim 1, wherein each of said first fiber structure and said main fiber structure is constituted by a preform selected from the group consisting of a woven preform and a braided preform.

4. The system according to claim 1, wherein the coupling further comprises a second machining layer reinforced by a second fiber structure distinct from said main fiber structure and machined so as to present a second machining exterior surface with fibers which have been cut, there being no intersection between said second machining exterior surface and the fibers of said main fiber structure, the matrices of said structural layer and of said second machining layer being identical, said second machining layer being situated on at least a fraction of the face opposite said main face.

5. The system according to claim 4, wherein each of said first fiber structure, said second fiber structure, and said main fiber structure is constituted by a preform selected from the group consisting of a woven preform and a braided preform.

6. The system according to claim 4, further comprising a backing plate with a mating surface,
 wherein the second machining exterior surface of the second machining layer is machined to correspond to the mating surface of the backing plate.

7. The system according to claim 1, wherein the coupling further comprises an angled region, said first machining layer being situated on a convex face of said angled region.

8. The system according to claim 7, wherein said angled region forms an angle lying in the range 90° to 180°.

9. The system according to claim 1, wherein the coupling includes a cylindrical region, a radial region, and an angled region connecting said cylindrical and radial regions, wherein said first machining layer is situated on a fraction of said radial region, a fraction of said cylindrical region, and on a convex face of said angled region.

10. A turbomachine including a system according to claim 1.

* * * * *